(12) United States Patent
Duque et al.

(10) Patent No.: US 12,197,520 B1
(45) Date of Patent: Jan. 14, 2025

(54) SYSTEMS AND METHODS FOR USING LOCATIONAL INDICATORS AND USER INTERACTIONS TO PROVIDE USER EXPERIENCES

(71) Applicant: Capital One Services, LLC, McLean, VA (US)

(72) Inventors: Julian Duque, Arlington, VA (US); Muhammad Uddin, San Bernardino, CA (US); Tania Cruz Morales, Washington, DC (US); Dwipam Katariya, McLean, VA (US); Kimberly Stockley, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/344,903

(22) Filed: Jun. 30, 2023

(51) Int. Cl.
*G06F 16/00* (2019.01)
*G06F 16/9535* (2019.01)
*G06F 16/9538* (2019.01)
*H04W 4/021* (2018.01)

(52) U.S. Cl.
CPC ...... *G06F 16/9535* (2019.01); *G06F 16/9538* (2019.01); *H04W 4/021* (2013.01)

(58) Field of Classification Search
CPC . G06F 16/9535; G06F 16/9538; H04W 4/021
USPC .................................................. 707/600–899
See application file for complete search history.

(56) References Cited

U.S. PATENT DOCUMENTS

| | | | |
|---|---|---|---|
| 9,877,162 B2 * | 1/2018 | Wyatt | H04W 4/029 |
| 11,205,196 B1 * | 12/2021 | Raviv | H04L 51/42 |
| 11,750,720 B1 * | 9/2023 | Pedone | H04L 43/067 |
| | | | 709/203 |
| 2015/0211881 A1 * | 7/2015 | Stauber | G01C 21/3484 |
| | | | 701/532 |
| 2016/0345132 A1 * | 11/2016 | Creighton | G01C 21/3697 |
| 2020/0118192 A1 * | 4/2020 | Deak | H04W 4/023 |

* cited by examiner

*Primary Examiner* — Michelle N Owyang
(74) *Attorney, Agent, or Firm* — TROUTMAN PEPPER HAMILTON SANDERS LLP; Christopher J. Forstner; John A. Morrissett (57) ABSTRACT

Disclosed embodiments can include a system for generating experiences. A system receives user data related to interactions by the user. The system identifies a set of trends for the user based on the interactions. The system receives a locational indicator, the locational indicator providing a first destination. The system searches locational data associated with the first destination to identify one or more experiences for the user. The system compares the set of trends with the locational data. The system calculates a first experience for the user. The system outputs, for display on a user device, the first experience.

20 Claims, 5 Drawing Sheets

SYSTEMS AND METHODS FOR USING LOCATIONAL INDICATORS AND USER INTERACTIONS TO PROVIDE USER EXPERIENCES

The disclosed technology relates to systems and methods for generating experiences based on historical data. Specifically, this disclosed technology relates to analyzing user historical data and locational indicators to provide custom user experiences.

BACKGROUND

Data can be leveraged to identify many user trends, trends such as user location and or interaction history. To date, however, there is no system in place that analyzes the interaction and locational data in such a particular order that enables customized, and user-specific experiences. For example, simply tracking a user's prior experiences cannot on its own provide any indication that the user intends to go to a destination outside of the user's base location, nor can it be used to provide customer experiences at the destination. These and other problems exist.

SUMMARY

Disclosed embodiments provide solutions to the aforementioned problems. Disclosed embodiments can include a system for generating experience recommendations based on historical data. The system can include one or more processors and a memory in communication with the one or more processors and storing instructions that, when executed by the one or more processors, are configured to cause the system to perform a process. The process can include receiving user historical data related to events completed using one or more accounts associated with a user. The process can include identifying, based on the user historical data, a set of interest trends for the user based on the events. The process can include receiving a locational indicator, for example identifying a future trip for the user. The locational indicator can provide a first destination. The process can include searching locational data associated with the first destination to identify one or more experiences for the user. The locational data can be compiled to include prior interaction (e.g., purchase) information for a plurality of users within a first predetermined distance from the first destination. The process can include comparing the set of interest trends with the locational data. The process can include calculating, based on the comparison of the set of interest trends with the locational data, a first experience for the user. The process can include outputting, for display on a user device, the first experience.

Disclosed embodiments can include a system for generating experiences based on historical data. The system can include one or more processors and a memory in communication with the one or more processors and storing instructions that, when executed by the one or more processors, are configured to cause the system to perform a process. The process can include receiving user historical data related to events completed using one or more accounts associated with the user. The process can include identifying, based on the user historical data, a set of interest trends for the user based on the events, the set of interest trends being based on particular events within entity categories of the user historical data over a predetermined period of time. The process can include receiving a locational indicator, for example identifying a future trip for the user, the locational indicator providing a first destination. The process can include searching locational data associated with the first destination to identify one or more experiences for the user, the locational data including a ranked list of entities associated with the entity categories. The process can include calculating, based on the search, a first experience for the user, the first experience including information about a first entity associated with the entity categories, the first entity having a physical location within a first predetermined distance from the first destination. The process can include outputting, for display on a graphical user interface (GUI) viewable on a user device, the first experience.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure related to systems and methods for generating experiences based on historical data. More particularly, the disclosed technology relates to leveraging compiled data related to historical consumer interactions so as to provide experiences to a consumer without the need for user input or request. The systems and methods described herein utilize, in some instances, graphical user interfaces, which are necessarily rooted in computers and technology. Graphical user interfaces are a computer technology that allows for user interaction with computers through touch, pointing devices, or other means. The present disclosure details the ability to search locational data associated with a user's destination to identify one or more experiences for the user. The locational data can be interactions for a plurality of users at a plurality of entities (defined herein as vendors, entities, or other experience providing entities) in the user's destination area. By analyzing this locational data and comparing it to user historical interaction/transaction data, a list of potential activities can be provided to the user. For instance, the input data can include user and locational interaction data, and the output can be experiences that may be embedded into an interactive digital mapping system to provide not only detailed views of recommended entity locations, but also detailed information about the entities. The GUI can also provide options to request time at the one or more entities at the destination. The system can communicate with external mapping services, planning services, and/or with entity backends via application programming interfaces (APIs) so as to generate the GUI. These particular improvements can, therefore, eliminate the need for a user to manually identify experiences to partake in, and eliminate the need for the user to manually look up information about and communicate with the entities that provide those experiences.

The systems and methods described herein utilize, in some instances, machine learning models, which are necessarily rooted in computers and technology. Machine learning models are a unique computer technology that involves training models to complete tasks and make decisions. The present disclosure details systems and methods that can learn user tendencies and interests based on previous interactions. For example, if a user interacts on Saturdays with a local farmers' market (e.g., makes a transaction there), the system can identify that the user enjoys that activity on that particular day of the week. Further, the system can learn from variations in the typical tendencies so as to update experiences that are based on the model. Using a machine learning model in this way can allow the system to continue to calculate up-to-date and accurate experiences. Overall, the systems and methods disclosed have significant practical applications in the field of data analytics because of the noteworthy improvements to how historical interaction data is analyzed, compiled, and manipulated to achieve output goals.

Although prior examples of simple trip planning algorithms and software exist, the present disclosure provides systems and methods that cannot be realized by prior software. For example, prior system could potentially see that someone is interested in a particular destination, for example by reviewing search history, but there is no method of leveraging that information because prior systems were not able to act on instantaneous feedback of (i) interactions or events that were actually completed by a user or (ii) actual indicators that the user is leaving, or planning to leave, a particular area (e.g., base location). For example, if a person searches the Kennedy Performing Arts Center, that does not mean the person is going to Washington D.C. If that person obtains tickets for the Kennedy Performing Arts Center, and Washington D.C. is greater than a predetermined distance from a base location (or a perimeter), then that can act as a locational indicator of a destination. The parameters can be adjusted, as described herein, to change the predetermined distance, change the indication of a base location, and change the categories of experiences that may be of interest to the user, among other things. Again, prior implementations of travel software cannot do this, as they do not utilize or form locational indicators to trigger a user leaving the base location.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
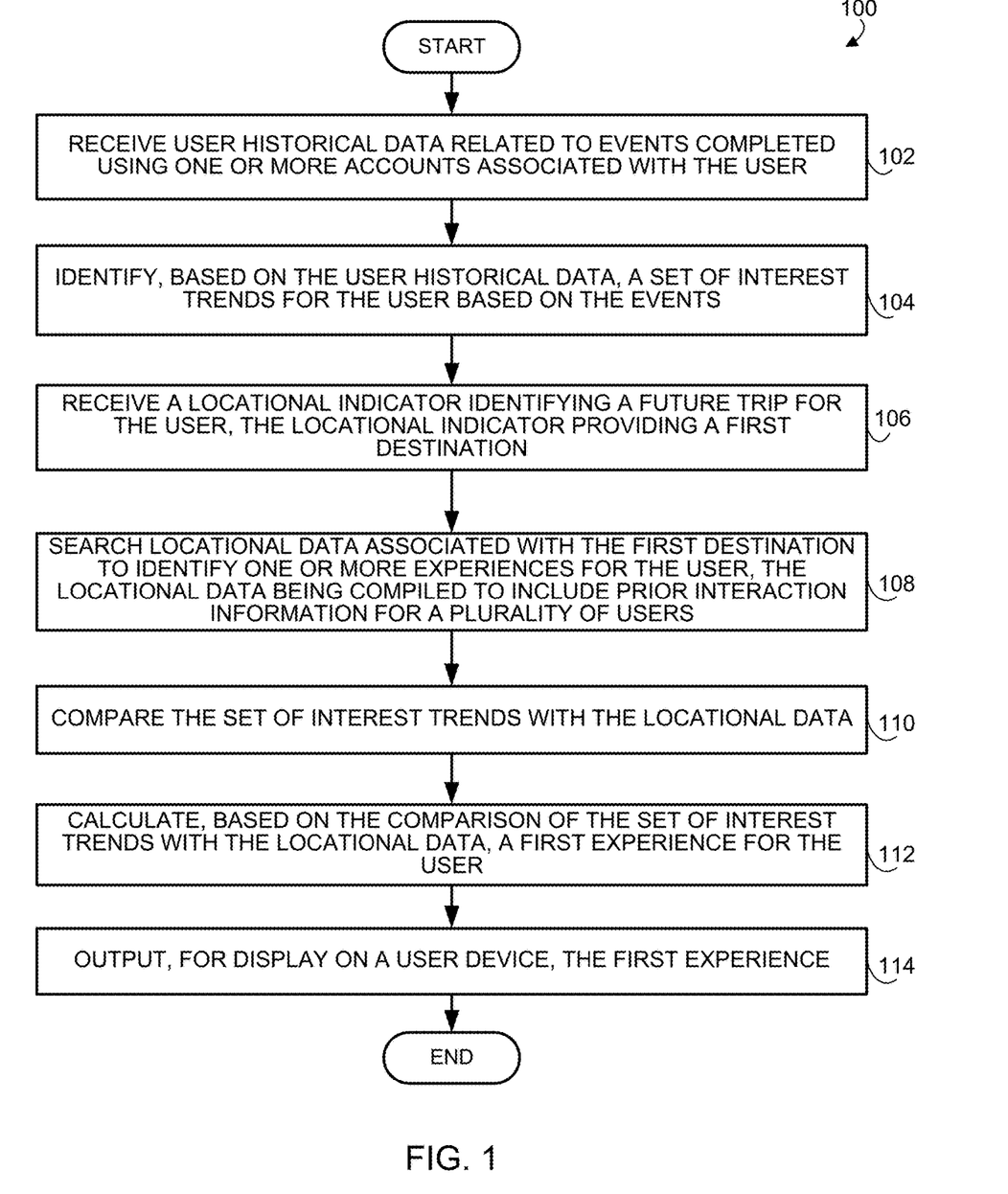
FIG. 1 is a flow diagram illustrating an exemplary method for generating experiences based on historical data, in accordance with certain embodiments of the disclosed technology.

FIG. 1 is a flow diagram illustrating an exemplary method 100 for generating experiences based on historical data, in accordance with certain embodiments of the disclosed technology. The steps of method 100 can be performed by one or more components of the system 400 (e.g., data monitoring system 320, web server 410 of data processing system 408, and/or user device 402), as described in more detail with respect to FIGS. 4 and 5.

In block 102, the data monitoring system 320 can receive user historical data related to events completed using one or more accounts associated with a user. The terms "event" and "events" throughout this disclosure shall be understood to mean purchases or other dealings with the entities completed by the subject user. The terms "interaction" and "interactions" throughout this disclosure shall be understood to mean purchases or other dealings with entities made by the compiled users at the destination. To be sure, "event," "events," "interaction," and "interactions" each refer to similar acts (i.e., interacting with the entity), but "event" and "events" are used separately to distinguish that the act is being described as from the point of view of the subject user that receives the experience suggestion.

Referring again to block 102, the user historical data can be a list of event data for the user that includes the trends for user trends and habits. This user historical data can include spending, timing, and entity trends. For example, the historical data can include information related to which types of entities the user interacts with (e.g., a good or service identifier), when the user interacts with those entities (e.g., a time identifier), and how much the user spends at those entities for each event. Use of the term "entity" herein will be understood to mean any provider of goods or services, including restaurants, entertainment, and the like, with whom the user can interact. Information about what types of entities the user is interacting with can be gathered at the time of the event, for example via a point-of-sale device or via online backend processing. In some examples, the system can identify from the data the exact entity that the user interacted with. Information provided by the entity during an event can include categories, e.g., entity categories, associated with the event. The categories can be determined, for example, via entity category codes (e.g., Merchant Category Codes) associated with the entity. The user historical data can also include timestamps associated with the particular event, which can help the system determine when the user has interest in interacting with that particular category of entity. As will be appreciated, the user historical data includes data that may be available to financial institutions, and thus the data monitoring system 320 can retrieve the data from the institution or, in some examples, the data monitoring system 320 can be associated with and/or operated by the institution (e.g., service provider 430). The one or more accounts associated with a user, therefore, can be one or more financial accounts hosted by the institution.

In block 104, the data monitoring system 320 can identify, based on the user historical data received in block 102, a set of interest trends for the user based on the events. These interest trends can be identified by leveraging the information about user events described above. To use an example, the user historical data can include data indicative of the user having interest in breakfast and/or brunch locations on Saturday mornings—e.g., the time stamp or time identifier for the event is before noon on Saturdays, and the entity category is "restaurants." This type of event data can be identified as an interest trend for that user. This information can be continuously compiled to maintain a database of interest trends for the user irrespective of whether the system proceeds to generate experiences in the following steps. In some examples, these trends can also be fed into a machine learning model (MLM) to train datasets on user trends. Interest trends can also be partitioned into user categories so that stakeholders can learn more about what types of users have certain events. This type of learning can be beneficial for the experiences described herein, but can also be beneficial for other types of experience engines, including advertisement targeting engines.

Referring again to method 100, in block 106, the data monitoring system 320 can receive a locational indicator. This locational identifier can be used to identify a future trip for the user. The locational indicator can provide a first destination that the user intends to visit. This locational indicator can be identified and thus received at the data monitoring system 320 in a number of ways. In one example, the locational indicator can be based on an event by user at an entity having a physical location outside of a predetermined distance from a base location of the user. The base location can be a geographic home location for the user that is saved, for example, by the aforementioned institution (e.g., service provider 430). The predetermined distance can be a trackable distance set by the system as a threshold to indicate that the user may be leaving a base location (e.g., is travelling), such as a distance of 50 miles, 100 miles, 150 miles, etc. To use an example, the base location for a user may be saved as Atlanta, Georgia, and the predetermined distance to indicate travel may be set to 100 miles. If the user interacts with a restaurant, hotel, shoppe or other entity having a physical location in Chattanooga, Tennessee, for example, that 117-mile distance from the base location could then act as a locational indicator, indicating the user may be interested in going to Chattanooga. This can also be viewed algorithmically, and rules can be put into place to adjust how far this outside-the-base predetermined distance is set in order to trigger a locational indicator. For example, if the predetermined distance is set to >50 miles, and the quantity of visits outside the predetermined distance is >X number of threshold times during a Y period (e.g., X=fifteen times over the past Y=one month), the system can update to set the predetermined distance to >100 miles. Further this predetermined distance can also change with respect to a predetermined perimeter defining the base-location, as will be described below.

Locational indicators based on events made outside of a predetermined distance may also have a temporal aspect, such that the locational indicator is not triggered unless a certain quantity of events is completed using the one or more user accounts over a predetermined period of time. This temporal aspect can be set by the system to only trigger the events as a locational indicator if there are more than one (e.g., two, three, etc.) events with entities having physical locations in the area over a period of time (e.g., a week, two weeks, a month, etc.). To use the Chattanooga destination example above to illustrate, the system may also have a threshold of three events over a period of one week in order to trigger a locational indicator. If the one event at the restaurant, hotel, shoppe or other entity in Chattanooga is the only event outside of the predetermined distance in one week, the system may not identify a locational indicator. However, if the user makes a second event at restaurant, hotel, shoppe or other entity having a physical location in Chattanooga within one week of the first event, then the system may flag that as a locational indicator with a destination of Chattanooga.

In some examples, the base location can change, meaning the predetermined distance that triggers a locational indicator can be fluid. To do so, the system can create, using the historical physical locations, an adjustable perimeter representing the base location. This adjustable perimeter can be a bubble defining events by the subject user over a period of time. For example, if the user completes 90% of the events within a perimeter defining one suburban city of Atlanta, the system can define the perimeter as that suburban city. If, however, the user begins completing a large quantity of events within a three-city perimeter, the system can update the perimeter. This continuous learning can be completed using an MLM. The system can continuously update, using the MLM, the adjustable perimeter based on subsequent events to have a real-time indication of the base location in which to determine the locational indicator.

In another example, the locational indicator can be based on search history for the user. The data monitoring system 320 receive a search history from an application operating on the user device (e.g., user device 402). The searching application can be associated with the same entity that operates the data monitoring system 320, or the searching application can be a third-party application from another entity (e.g., Google™ search engine, Bing™, etc.). In the examples of a third-party application providing the search history, the data monitoring system 320 can operate an application on the user device 402 to communicate with the searching application, for example by using an API. The search history that can allude to a locational indicator can include searching for hotels, restaurants, and/or attractions in a location outside of a predetermined distance from a user's base (e.g., the base location described above).

Referring again to method 100, in block 108, the data monitoring system 320 can search locational data associated with the first destination to identify one or more experiences for the user. The locational data can be compiled to include prior interaction information for a plurality of users within a first predetermined distance from the first destination. The prior interaction information for a plurality of users can be similar to the user historical data (e.g., types of entities, types of good/services, time identifiers, etc.) but can be compiled for a plurality of users. The predetermined distance can be a set distance (e.g., 10 miles, 25 miles, etc.) from the destination identified by the locational indicator in block 106.

In block 110, the data monitoring system 320 can compare the set of interest trends with the locational data to identify similar trends between the user's data near the base location and the plurality of users in the destination area. These similar trends can be based on, for example, the subject user and the plurality of users in the destination area having spends in the same categories, at the same times, on the same days, etc. Certain institutions can track types of spending and place such spending into graphs showing spending habits. For example, a user may spend 10% of their budget on entertainment and 25% of their budget on restaurants (including 1% at coffee shops), the system can then identify a plurality of users in the destination area that similarly spend 10% of their budget on entertainment and 25% of their budget on restaurants (including 1% at coffee shops) in order to compare trends. Thresholds can be set, such that the plurality of user spends can be ±X % in a particular category to be considered a similar interactor.

In block 112, the data monitoring system 320 can calculate, based on the comparison of the set of interest trends with the locational data, a first experience for the user. The experience can include an entity name, an entity location, a time to visit the entity, and the like, all derived from locational data. Using the Chattanooga destination example above, the interest trends for the user can indicate that the user has interest in breakfast and/or brunch locations on Saturday mornings, and that the plurality of users in the compiled locational data tend to visit a particular restaurant in Chattanooga on Saturday mornings. Using this information, the data monitoring system 320 can provide an experience to visit that particular restaurant on the Saturday morning the user may be in Chattanooga. In some examples, the system can also calculate, based on the comparison of the set of interest trends with the locational data, a second experience for the user. This second location can include a different entity at a different time. For example, the data monitoring system 320 may also identify that the user has monthly events at a local art museum, thus indicating that art museums are an identifiable interest to the user. The data monitoring system 320 can identify art museums attended in the destination area, and recommend that destination in addition to the first destination. More information about experience lists generated by the present systems and methods is provided in the discussion of FIG. 3.

In block 114, the data monitoring system 320 can output, for display on a user device, the first experience. This experience can include a list view of all the entity/time experiences generated in blocks 102-112. In some examples, the experience can include a ranked list of one or more entities within the locational data. The ranked list can be created by identifying a quantity of interactions completed at the one or more entities by the plurality of users and ranking more frequented entities above less frequented entities. This embodiment can be a setting created by the data monitoring system 320 and/or the user so as to provide preference to lesser known (e.g., non-chain) entities in a destination area. For example, the data monitoring system 320 can receive user preferences indicating the user wishes to interact with the less frequented entities, and the system can remove an upper threshold of entities from the ranked list. The upper threshold of entities can include the more frequented entities. In some examples, the experience can be displayed in an interactive GUI, which is described in greater detail with respect to the discussion of FIG. 3.

Method 100 can end after block 114. In other examples, additional steps can be completed in view of the embodiments described herein. For example, regarding the MLM described above, the data monitoring system 320 can receive an event indication from a first entity associated with the first experience showing that the user did in fact interact (e.g., made a transaction) with the entity in the experience. The data monitoring system 320 can then retrain an MLM based on the event indication to reconfigure the locational data and the ranked list described above with reference to block 114. For example, the ranked list can be updated to include the event indication and therefore change the ranking of the more frequented entities and less frequented entities. For embodiments that include settings allowing less-frequented establishments to have preference over more-frequented establishments, the MLM can then learn how to change the upper threshold of entities in the ranked list.

Figure 2:
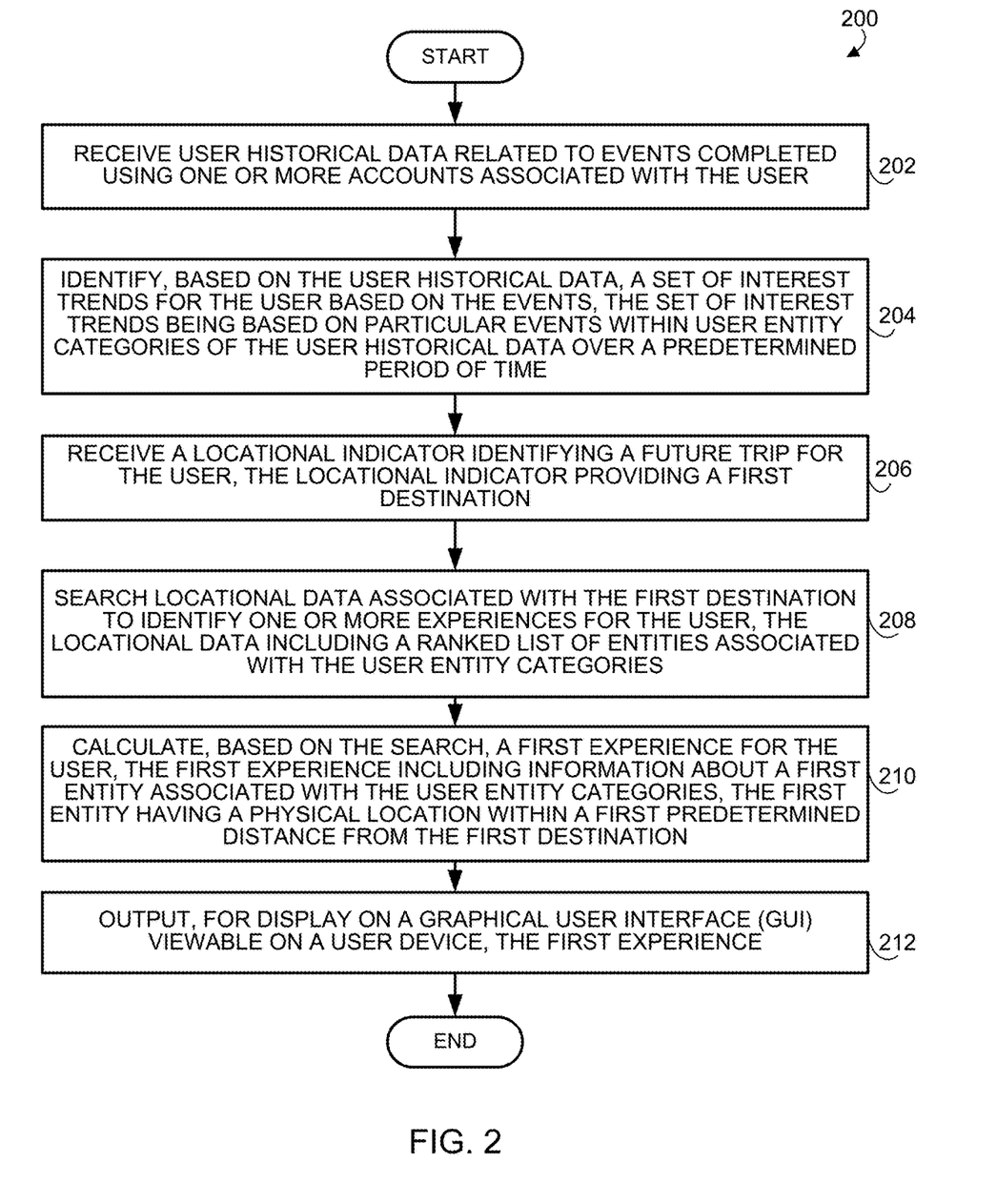
FIG. 2 is a flow diagram illustrating an exemplary method for generating experiences based on historical data, in accordance with certain embodiments of the disclosed technology.

FIG. 2 is a flow diagram illustrating an exemplary method 200 for generating experiences based on historical data, in accordance with certain embodiments of the disclosed technology. The steps of method 200 can be performed by one or more components of the system 400 (e.g., data monitoring system 320, web server 410 of data processing system 408, and/or user device 402), as described in more detail with respect to FIGS. 4 and 5.

Method 200 of FIG. 2 is similar to method 100 of FIG. 1, yet method 200 contains further detail related to outputting an experience for display in a GUI of a user device (e.g., user device 402). Additional details of an example GUI are provided herein with respect to FIG. 3. Referring now to FIG. 2, in block 202, the data monitoring system 320 can receive user historical data related to user events completed using one or more accounts associated with the user. This step can be similar to the step described above with respect to block 102.

In block 204, the data monitoring system 320 can identify, based on the user historical data, a set of interest trends for the user based on the user events. This step can be similar to the step described above with respect to block 202. Here, the set of interest trends can be based on events within entity categories of the user historical data over a predetermined period of time. For example, if the account owner makes a predetermined number of events at one type of entity over a predetermined period of time, that can be flagged as an interest trend. Using an example, the user may make three events at an ice cream parlor in two weeks, which the system can flag as an interest trend.

In block 206, the data monitoring system 320 can receive a locational indicator, the locational indicator providing a first destination. This step can be similar to the step described above with respect to block 106.

In block 208, the data monitoring system 320 can search locational data associated with the first destination to identify one or more experiences for the user. This step can be similar to the step described above with respect to block 208. Here, the locational data can include a ranked list of entities associated with the entity categories. The entity ranking can be performed in accordance with the embodiment described above with reference to block 114.

In block 210, the data monitoring system 320 can calculate, based on the search in block 208, a first experience for the user. The first experience can include information about a first entity associated with the entity categories. The first entity can have a physical location within a first predetermined distance from the first destination. The predetermined distance can be, for example, within a distance of a physical location of the entity associated with the locational indicator.

In block 212, the data monitoring system 320 can output, for display on a GUI viewable on a user device (e.g., user device 402), the first experience. This step can be similar to the step described above with respect to block 114. Additional examples of how the experience can be output to a GUI are described with reference to FIG. 3. Method 200 can end after block 112. In other examples, additional steps can be completed in view of the embodiments described herein. For example, regarding the MLM described above, the data monitoring system 320 can receive an event indication from a first entity associated with the first experience showing that the user did in fact interact (e.g., made a transaction) with the entity based on the experience. The data monitoring system 320 can then retrain an MLM based on the event indication to reconfigure the locational data and the ranked list described above with reference to block 114. For example, the ranked list can be updated to include the event indication and therefore change the ranking of the more frequented entities and less frequented entities. For embodiments that include settings allowing less-frequented establishments to have preference over more-frequented establishments, the MLM can then learn how to change the upper threshold of entities in the ranked list.

Figure 3:
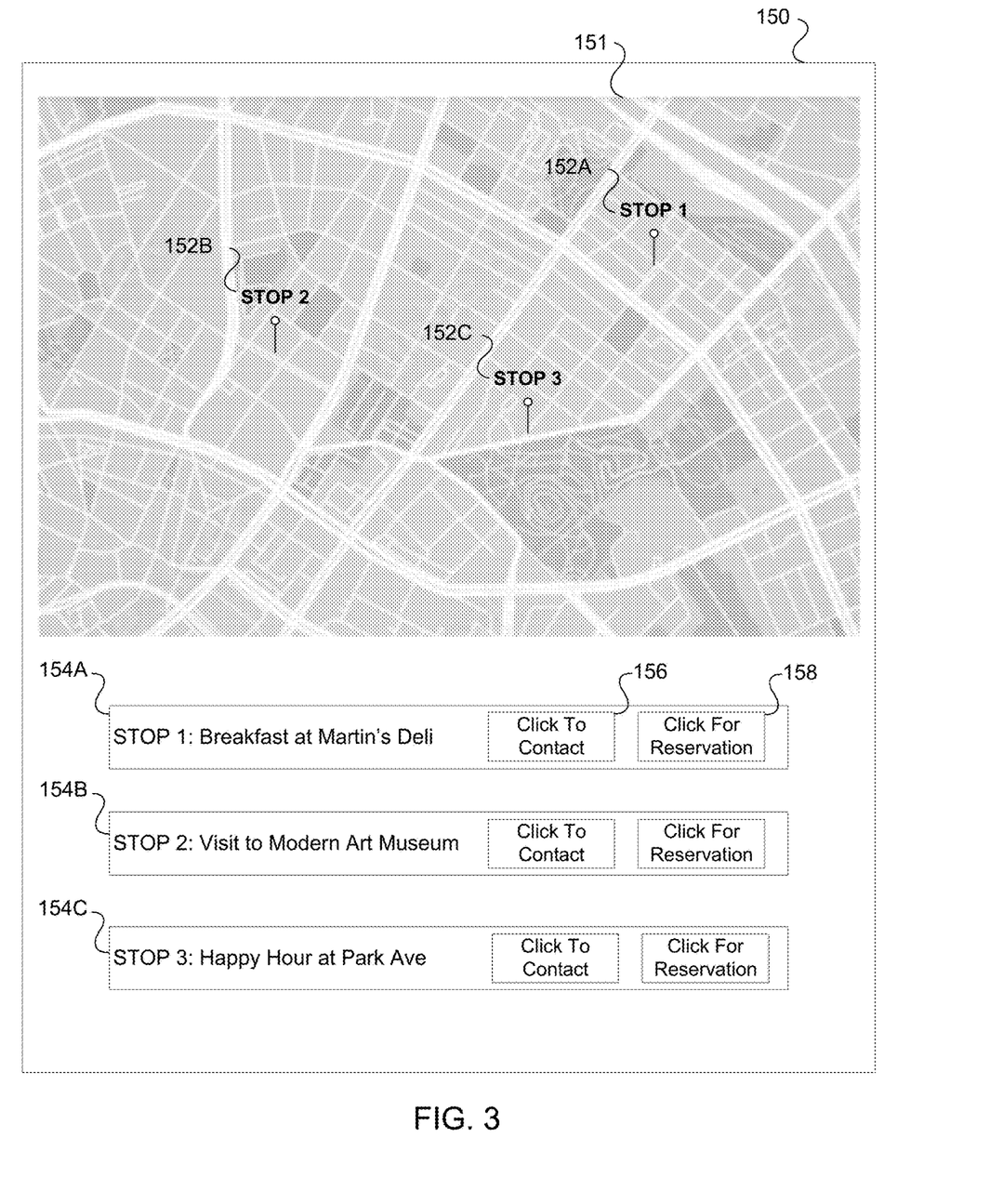
FIG. 3 is an example graphical user interface (GUI) providing experiences generated on historical data, in accordance with certain embodiments of the disclosed technology.

FIG. 3 is an example GUI 150 providing experiences generated on historical data, in accordance with certain embodiments of the disclosed technology. In some examples, the experiences described herein can be displayed in interactive interfaces that can integrate and compile information from other data sources, such as mapping services (e.g., mapping services 440) or planning services (e.g., planning services 445). The GUI 150 in FIG. 3 shows a digital map 151 that includes a plurality of entity experiences embedded therein. For example, the digital map 151 can include a first geographic location 152A showing where a first entity (e.g., first experience) is located in the destination area, and in some cases a second geographic location 152B showing where a second entity is located and a third geographic location 152C showing where a third entity is located. This data for embedding or superimposing the geographic locations on the digital map 151 can be received from a mapping service that communicates with the data monitoring system 320. Once the data monitoring system 320 identifies a first experience (e.g., an entity), the system can identify an address associated with that entity and superimpose the geographic location onto the map. The map can come from an external server (e.g., mapping services 440) such as Google™ Maps and the like. The data monitoring system 320 can communicate with the mapping services 440 via an API.

In some examples, the GUI 150 can include a list that ranks the different destinations chronologically, so that the user has a full list of establishments to visit and when. This output data can be achieved by analyzing the time identifiers in the user historical data. Using the example in FIG. 3 to illustrate, the data monitoring system 320 can rank a first stop 154A on a list as something the user historically has interest in the mornings, a second stop 154B on the list as something the user historically has interest in mid-day, and a third stop 154C on the list as something the user historically has interest in the afternoons. This information can also be supplied in the digital map 151 by showing a first stop, second stop, third stop, etc. In some examples, the list can also provide options to contact any of the entities in the list, for example by providing a clickable contact icon 156 that the user can interact with. This clickable contact icon 156 can allow the user device 402 to directly contact the entity, and the contact information can be retrieved from a third-party service, such as mapping services 440, a planning service 445, and/or external devices 404. In some examples, the GUI 150 can also include a clickable request field 158 that the user can interact with to make an experience request at any of the entities on the list. The clickable request field 158 can allow the user device 402 to communicate directly with a third-party service 445 (e.g., OpenTable™, Live Nation™, etc.) or directly with entity systems (e.g., external devices 404). The data monitoring system 320 can communicate with the planning service 445 and/or external devices 404 via an API.

Figure 4:
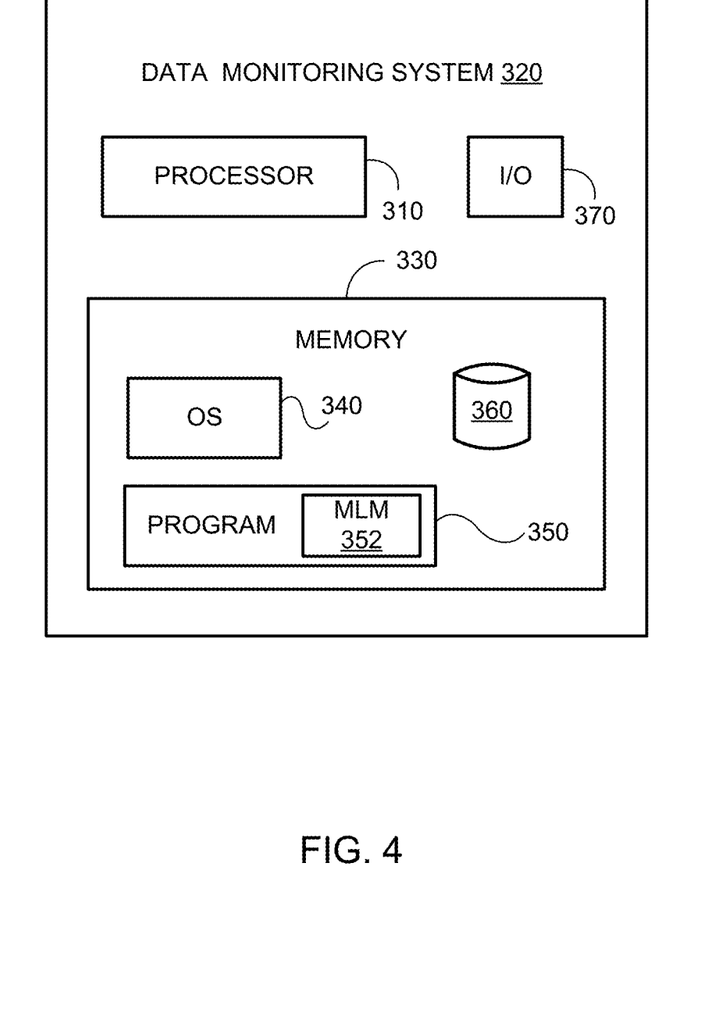
FIG. 4 is block diagram of an example notification system used to generate experiences based on historical data, in accordance with certain embodiments of the disclosed technology.
Figure 5:
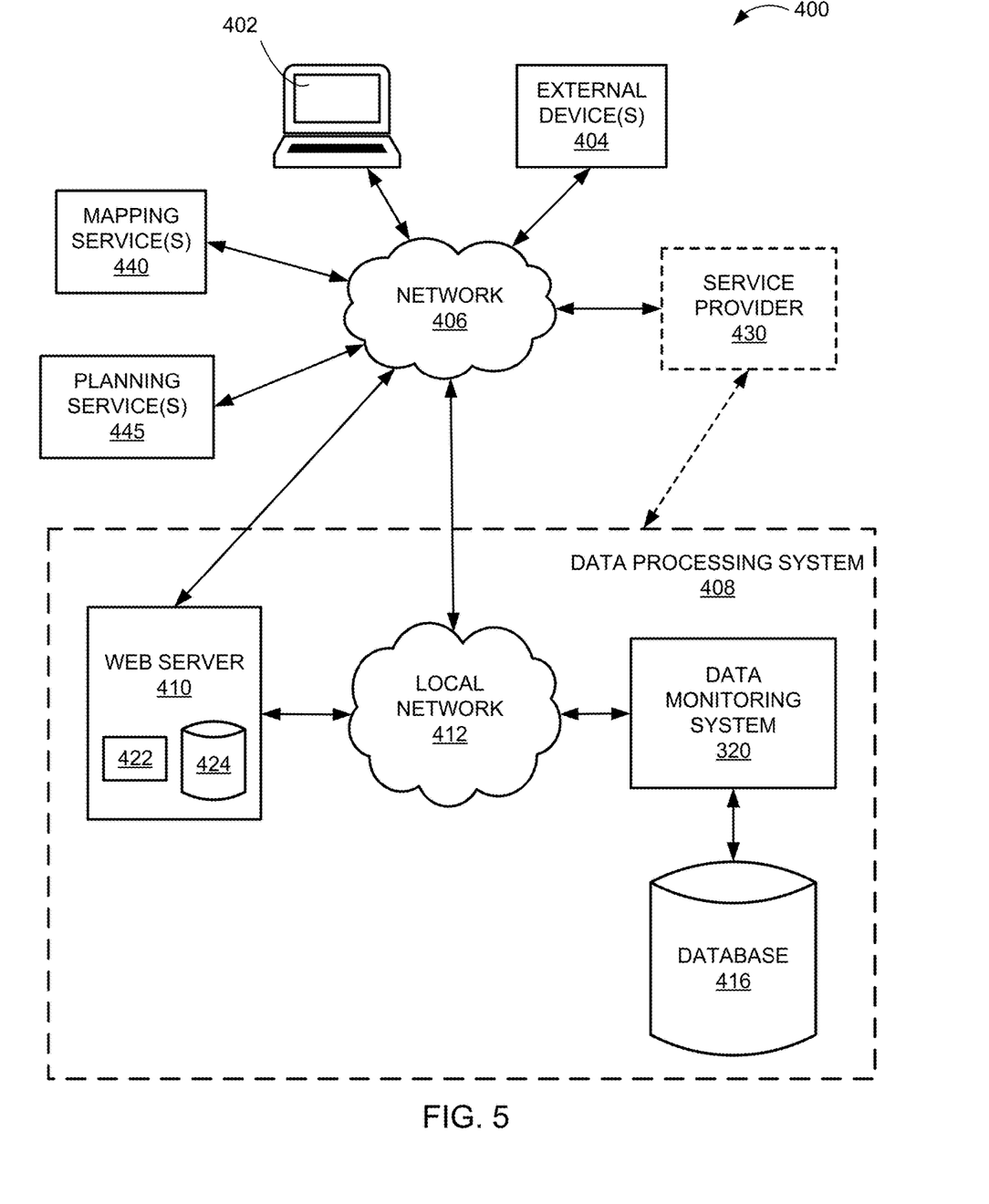
FIG. 5 is block diagram of an example system that can be used to generate experiences based on historical data, in accordance with certain embodiments of the disclosed technology.

FIG. 4 is a block diagram of an example data monitoring system 320 used to generate experiences based on historical data, according to an example implementation of the disclosed technology. According to some embodiments, the user device 402, mapping services 440, planning services 445, external devices 404, service provider 430, and web server 410, as depicted in FIG. 5 and described below, can have a similar structure and components that are similar to those described with respect to data monitoring system 320 shown in FIG. 4. As shown, the data monitoring system 320 can include a processor 310, an input/output (I/O) device 370, a memory 330 containing an operating system (OS) 340 and a program 350. In some examples, the program can include an MLM as described herein (e.g., MLM 352). In certain example implementations, the data monitoring system 320 can be a single server or can be configured as a distributed computer system including multiple servers or computers that interoperate to perform one or more of the processes and functionalities associated with the disclosed embodiments. In some embodiments data monitoring system 320 can be one or more servers from a serverless or scaling server system. In some embodiments, the data monitoring system 320 can further include a peripheral interface, a transceiver, a mobile network interface in communication with the processor 310, a bus configured to facilitate communication between the various components of the data monitoring system 320, and a power source configured to power one or more components of the data monitoring system 320.

A peripheral interface, for example, can include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface can include a serial port, a parallel port, a general-purpose input and output (GPIO) port, a game port, a universal serial bus (USB), a micro-USB port, a high-definition multimedia interface (HDMI) port, a video port, an audio port, a Bluetooth™-port, a near-field communication (NFC) port, another like communication interface, or any combination thereof.

In some embodiments, a transceiver can be configured to communicate with compatible devices and ID tags when they are within a predetermined range. A transceiver can be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface can provide access to a cellular network, the Internet, or another wide-area or local area network. In some embodiments, a mobile network interface can include hardware, firmware, and/or software that allow(s) the processor(s) 310 to communicate with other devices via wired or wireless networks, whether local or wide area, private or public, as known in the art. A power source can be configured to provide an appropriate alternating current (AC) or direct current (DC) to power components.

The processor 310 can include one or more of a microprocessor, microcontroller, digital signal processor, co-processor or the like or combinations thereof capable of executing stored instructions and operating upon stored data. The memory 330 can include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein can be implemented as a combination of executable instructions and data stored within the memory 330.

The processor 310 can be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 can constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 can be a single core processor that is configured with virtual processing technologies. In certain embodiments, the processor 310 can use logical processors to simultaneously execute and control multiple processes. The processor 310 can implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the data monitoring system 320 can include one or more storage devices configured to store information used by the processor 310 (or other components) to perform certain functions related to the disclosed embodiments. In one example, the data monitoring system 320 can include the memory 330 that includes instructions to enable the processor 310 to execute one or more applications, such as server applications, network communication processes, and any other type of application or software known to be available on computer systems. Alternatively, the instructions, application programs, etc. can be stored in an external storage or available from a memory over a network. The one or more storage devices can be a volatile or non-volatile, magnetic, semiconductor, tape, optical, removable, non-removable, or other type of storage device or tangible computer-readable medium.

The data monitoring system 320 can include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the data monitoring system 320 can include the memory 330 that can include one or more programs 350 to perform one or more functions of the disclosed embodiments. For example, in some embodiments, the data monitoring system 320 can additionally manage dialogue and/or other interactions with the user via a program 350.

The processor 310 can execute one or more programs 350 located remotely from the data monitoring system 320. For example, the data monitoring system 320 can access one or more remote programs that, when executed, perform functions related to disclosed embodiments.

The memory 330 can include one or more memory devices that store data and instructions used to perform one or more features of the disclosed embodiments. The memory 330 can also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 can include software components that, when executed by the processor 310, perform one or more processes consistent with the disclosed embodiments. In some embodiments, the memory 330 can include a notification system database 360 for storing related data to enable the data monitoring system 320 to perform one or more of the processes and functionalities associated with the disclosed embodiments.

The notification system database 360 can include stored data relating to status data (e.g., average session duration data, location data, idle time between sessions, and/or average idle time between sessions) and historical status data. According to some embodiments, the functions provided by the notification system database 360 can also be provided by a database that is external to the data monitoring system 320, such as the database 416 as shown in FIG. 5.

The data monitoring system 320 can also be communicatively connected to one or more memory devices (e.g., databases) locally or through a network. The remote memory devices can be configured to store information and can be accessed and/or managed by the data monitoring system 320. By way of example, the remote memory devices can be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The data monitoring system 320 can also include one or more I/O devices 370 that can comprise one or more interfaces for receiving signals or input from devices and providing signals or output to one or more devices that allow data to be received and/or transmitted by the data monitoring system 320. For example, the data monitoring system 320 can include interface components, which can provide interfaces to one or more input devices, such as one or more keyboards, mouse devices, touch screens, track pads, trackballs, scroll wheels, digital cameras, microphones, sensors, and the like, that enable the data monitoring system 320 to receive data from a user (such as, for example, via the user device 402).

In examples of the disclosed technology, the data monitoring system 320 can include any number of hardware and/or software applications that are executed to facilitate any of the operations. The one or more I/O interfaces can be utilized to receive or collect data and/or user instructions from a wide variety of input devices. Received data can be processed by one or more computer processors as desired in various implementations of the disclosed technology and/or stored in one or more memory devices.

The data monitoring system 320 can contain programs that train, implement, store, receive, retrieve, and/or transmit one or more machine learning models. Machine learning models (e.g., MLM 352) can include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models can include an ensemble model (e.g., a model comprised of a plurality of models). In some embodiments, training of a model can terminate when a training criterion is satisfied. Training criterion can include a number of epochs, a training time, a performance metric (e.g., an estimate of accuracy in reproducing test data), or the like. The data monitoring system 320 can be configured to adjust model parameters during training. Model parameters can include weights, coefficients, offsets, or the like. Training can be supervised or unsupervised.

The data monitoring system 320 can be configured to train machine learning models by optimizing model parameters and/or hyperparameters (hyperparameter tuning) using an optimization technique, consistent with disclosed embodiments. Hyperparameters can include training hyperparameters, which can affect how training of the model occurs, or architectural hyperparameters, which can affect the structure of the model. An optimization technique can include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The data monitoring system 320 can be configured to optimize statistical models using known optimization techniques.

Furthermore, the data monitoring system 320 can include programs configured to retrieve, store, and/or analyze properties of data models and datasets. For example, data monitoring system 320 can include or be configured to implement one or more data-profiling models. A data-profiling model can include machine learning models and statistical models to determine the data schema and/or a statistical profile of a dataset (e.g., to profile a dataset), consistent with disclosed embodiments. A data-profiling model can include an RNN model, a CNN model, or other machine-learning model.

The data monitoring system 320 can include algorithms to determine a data type, key-value pairs, row-column data structure, statistical distributions of information such as keys or values, or other property of a data schema can be configured to return a statistical profile of a dataset (e.g., using a data-profiling model). The data monitoring system 320 can be configured to implement univariate and multivariate statistical methods. The data monitoring system 320 can include a regression model, a Bayesian model, a statistical model, a linear discriminant analysis model, or other classification model configured to determine one or more descriptive metrics of a dataset. For example, data monitoring system 320 can include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The data monitoring system 320 can be configured to return a statistical profile of a dataset (e.g., using a data-profiling model or other model). A statistical profile can include a plurality of descriptive metrics. For example, the statistical profile can include an average, a mean, a standard deviation, a range, a moment, a variance, a covariance, a covariance matrix, a similarity metric, or any other statistical metric of the selected dataset. In some embodiments, data monitoring system 320 can be configured to generate a similarity metric representing a measure of similarity between data in a dataset. A similarity metric can be based on a correlation, covariance matrix, a variance, a frequency of overlapping values, or other measure of statistical similarity.

The data monitoring system 320 can be configured to generate a similarity metric based on data model output, including data model output representing a property of the data model. For example, data monitoring system 320 can be configured to generate a similarity metric based on activation function values, embedding layer structure and/or outputs, convolution results, entropy, loss functions, model training data, or other data model output). For example, a synthetic data model can produce first data model output based on a first dataset and a produce data model output based on a second dataset, and a similarity metric can be based on a measure of similarity between the first data model output and the second-data model output. In some embodiments, the similarity metric can be based on a correlation, a covariance, a mean, a regression result, or other similarity between a first data model output and a second data model output. Data model output can include any data model output as described herein or any other data model output (e.g., activation function values, entropy, loss functions, model training data, or other data model output). In some embodiments, the similarity metric can be based on data model output from a subset of model layers. For example, the similarity metric can be based on data model output from a model layer after model input layers or after model embedding layers. As another example, the similarity metric can be based on data model output from the last layer or layers of a model.

The data monitoring system 320 can be configured to classify a dataset. Classifying a dataset can include determining whether a dataset is related to another datasets. Classifying a dataset can include clustering datasets and generating information indicating whether a dataset belongs to a cluster of datasets. In some embodiments, classifying a dataset can include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data can be based on a similarity metric. Edge data can and indicate a similarity between datasets and/or a hierarchical relationship (e.g., a data lineage, a parent-child relationship). In some embodiments, classifying a dataset can include generating graphical data, such as anode diagram, a tree diagram, or a vector diagram of datasets. Classifying a dataset can include estimating a likelihood that a dataset relates to another dataset, the likelihood being based on the similarity metric.

The data monitoring system 320 can include one or more data classification models to classify datasets based on the data schema, statistical profile, and/or edges. A data classification model can include a convolutional neural network, a random forest model, a recurrent neural network model, a support vector machine model, or another machine learning model. A data classification model can be configured to classify data elements as actual data, synthetic data, related data, or any other data category. In some embodiments, data monitoring system 320 is configured to generate and/or train a classification model to classify a dataset, consistent with disclosed embodiments.

The data monitoring system 320 can also contain one or more prediction models. Prediction models can include statistical algorithms that are used to determine the probability of an outcome, given a set amount of input data. For example, prediction models can include regression models that estimate the relationships among input and output variables. Prediction models can also sort elements of a dataset using one or more classifiers to determine the probability of a specific outcome. Prediction models can be parametric, non-parametric, and/or semi-parametric models.

In some examples, prediction models can cluster points of data in functional groups such as "random forests." Random Forests can comprise combinations of decision tree predictors. (Decision trees can comprise a data structure mapping observations about something, in the "branch" of the tree, to conclusions about that thing's target value, in the "leaves" of the tree.) Each tree can depend on the values of a random vector sampled independently and with the same distribution for all trees in the forest. Prediction models can also include artificial neural networks. Artificial neural networks can model input/output relationships of variables and parameters by generating a number of interconnected nodes which contain an activation function. The activation function of a node can define a resulting output of that node given an argument or a set of arguments. Artificial neural networks can generate patterns to the network via an 'input layer', which communicates to one or more "hidden layers" where the system determines regressions via a weighted connection. Prediction models can additionally or alternatively include classification and regression trees, or other types of models known to those skilled in the art. To generate prediction models, the notification system can analyze information applying machine-learning methods.

While the data monitoring system 320 has been described as one form for implementing the techniques described herein, other, functionally equivalent, techniques can be employed. For example, some or all of the functionality implemented via executable instructions can also be implemented using firmware and/or hardware devices such as application specific integrated circuits (ASICs), programmable logic arrays, state machines, etc. Furthermore, other implementations of the data monitoring system 320 can include a greater or lesser number of components than those illustrated.

FIG. 5 is a block diagram of an example system that can be used to view and interact with data processing system 408, according to an example implementation of the disclosed technology. The components and arrangements shown in FIG. 5 are not intended to limit the disclosed embodiments as the components used to implement the disclosed processes and features can vary. As shown, data processing system 408 can interact with a user device 402, mapping services 440, planning services 445, external devices 404, and service provider 430 via a network 406. In certain example implementations, the data processing system 408 can include a local network 412, a data monitoring system 320, a web server 410, and a database 416.

In some embodiments, a user can operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the data processing system 408. In some embodiments, the user device 402 can include or incorporate electronic communication devices for hearing or vision impaired users.

Users may include individuals such as, for example, subscribers, clients, prospective clients, or institution users of an entity associated with an organization, such as individuals who have obtained, will obtain, or can obtain a product, service, or consultation from or conduct an interaction or event in relation to an entity associated with the data processing system 408. According to some embodiments, the user device 402 can include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 can be of any suitable type, including individual connections via the internet such as cellular or WiFi networks. In some embodiments, the network 406 can connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted can be personal or confidential, security concerns can dictate one or more of these types of connections be encrypted or otherwise secured. In some embodiments, however, the information being transmitted can be less personal, and therefore the network connections can be selected for convenience over security.

The network 406 can include any type of computer networking arrangement used to exchange data. For example, the network 406 can be the Internet, a private data network, virtual private network (VPN) using a public network, and/or other suitable connection(s) that enable(s) components in the system 400 environment to send and receive information between the components of the system 400. The network 406 can also include a PSTN and/or a wireless network.

The data processing system 408 can be associated with and optionally controlled by one or more entities such as a business, corporation, individual, partnership, or any other entity that provides one or more of goods, services, and consultations to individuals such as users. In some embodiments, the data processing system 408 can be controlled by a third party on behalf of another business, corporation, individual, partnership. The data processing system 408 can include one or more servers and computer systems for performing one or more functions associated with products and/or services that the organization provides.

Web server 410 can include a computer system configured to generate and provide one or more websites accessible to users, as well as any other individuals involved in access system 408's normal operations. Web server 410 can include a computer system configured to receive communications from user device 402 via for example, a mobile application, a chat program, an instant messaging program, a voice-to-text program, an SMS message, email, or any other type or format of written or electronic communication. Web server 410 can have one or more processors 422 and one or more web server databases 424, which can be any suitable repository of website data. Information stored in web server 410 can be accessed (e.g., retrieved, updated, and added to) via local network 412 and/or network 406 by one or more devices or systems of system 400. In some embodiments, web server 410 can host websites or applications that can be accessed by the user device 402. For example, web server 410 can host a service provider website that a user device can access by providing an attempted login that are authenticated by the data monitoring system 320. According to some embodiments, web server 410 can include software tools, similar to those described with respect to user device 402 above, that can allow web server 410 to obtain network identification data from user device 402. The web server can also be hosted by an online provider of website hosting, networking, cloud, or backup services, such as Microsoft Azure™ or Amazon Web Services™.

The local network 412 can include any type of computer networking arrangement used to exchange data in a localized area, such as WiFi, Bluetooth™, Ethernet, and other suitable network connections that enable components of the data processing system 408 to interact with one another and to connect to the network 406 for interacting with components in the system 400 environment. In some embodiments, the local network 412 can include an interface for communicating with or linking to the network 406. In other embodiments, certain components of the data processing system 408 can communicate via the network 406, without a separate local network 406.

The data processing system 408 can be hosted in a cloud computing environment (not shown). The cloud computing environment can provide software, data access, data storage, and computation. Furthermore, the cloud computing environment can include resources such as applications (apps), VMs, virtualized storage (VS), or hypervisors (HYP). User device 402 can be able to access data processing system 408 using the cloud computing environment. User device 402 can be able to access data processing system 408 using specialized software. The cloud computing environment can eliminate the need to install specialized software on user device 402.

In accordance with certain example implementations of the disclosed technology, the data processing system 408 can include one or more computer systems configured to compile data from a plurality of sources the data monitoring system 320, web server 410, and/or the database 416. The data monitoring system 320 can correlate compiled data, analyze the compiled data, arrange the compiled data, generate derived data based on the compiled data, and store the compiled and derived data in a database such as the database 416. According to some embodiments, the database 416 can be a database associated with an organization and/or a related entity that stores a variety of information relating to users, transactions, ATM, and business operations. The database 416 can also serve as a back-up storage device and can contain data and information that is also stored on, for example, database 360, as discussed with reference to FIG. 4.

Example Use Case

The following example use case describes an example of a typical user flow pattern. This section is intended solely for explanatory purposes and not in limitation.

Jim has an account at National Trust and makes purchases (e.g., events) using three different accounts at the entity, i.e., two credit card accounts and one checking account. National Trust monitors Jim's spending habits so as to identify trends reflected therein. Jim is also an avid traveler, and uses the accounts to book himself several vacations throughout the year.

Jim decides he would like to go to Washington D.C. from his home in Charlotte, North Carolina, a distance of about 385 miles. He reserves a car for his trip, with the car service having a location in Washington D.C. National Trust recognizes this event as a car in view of the entity's entity category code. National Trust then analyzes that the entity has a location more than 100 miles from Jim's base location (his home in Charlotte), and thus a locational indicator is triggered.

National Trust then parses Jim's historical event data and identifies that he interacts with different coffee shops throughout the month, and at least three times a week. Using this historical data, National Trust searches interaction history of users within the Washington D.C. area, finds a list of the top ten most popular coffee shops, and sends the list to Jim in a GUI displayable on his mobile device. The GUI lists the coffee shops in order of most-frequented (i.e., the highest number of interactions by the compiled users), and also provides the locations of the coffee ships in a digital map. Jim considers this list when he visits his destination in Washington D.C.

Using the same fact pattern as above, in another scenario the GUI that is sent to his mobile device with a notification that asks Jim if he would like to remove an upper threshold of entities from the ranked list, thereby removing the largest chain coffeeshops. Jim selects this option, and the GUI regenerates with only the coffee shops ranked fourth to tenth of the most popular coffee shops as identified by the compiled Washington D.C. user locational data.

In some examples, disclosed systems or methods can involve one or more of the following clauses:

Clause 1: A system comprising: one or more processors; and a memory in communication with the one or more processors and storing instructions that, when executed by the one or more processors, are configured to cause the system to: receive user historical data related to events completed using one or more accounts associated with the user; identify, based on the user historical data, a set of interest trends for the user based on the events; receive a locational indicator identifying a future trip for the user, the locational indicator providing a first destination; search locational data associated with the first destination to identify one or more experiences for the user, the locational data being compiled to include prior interaction information for a plurality of users within a first predetermined distance from the first destination; compare the set of interest trends with the locational data; calculate, based on the comparison of the set of interest trends with the locational data, a first experience for the user; and output, for display on a user device, the first experience.

Clause 2: The system of Clause 1, wherein the instructions further cause the system to create a ranked list of one or more entities within the locational data, the ranked list being created by identifying a quantity of interactions completed at the one or more entities by the plurality of users and ranking more frequented entities above less frequented entities.

Clause 3: The system of Clause 2, wherein the instructions further cause the system to: receive user preferences indicating the user wishes to interact with the less frequented entities; and remove an upper threshold of entities from the ranked list, the upper threshold of entities including the more frequented entities.

Clause 4: The system of Clause 2 or 3, wherein the instructions further cause the system to: receive an event indication from a first entity associated with the first experience, the event indication including data that the user interacted with the first entity; and retrain a machine learning model (MLM) based on the event indication to reconfigure the locational data and the ranked list.

Clause 5: The system of any of the preceding Clauses, wherein identifying the set of interest trends for the user comprises identifying entity categories within the user historical data, wherein the entity categories provide an indication of a type of good or service offered by one or more entities within the user historical data.

Clause 6: The system of Clause 5, wherein identifying the set of interest trends for the user further comprises identifying time identifiers associated with one or more interactions associated with the entity categories, wherein the time identifiers provide an indication of when the user interacts with the one or more entities within the user historical data.

Clause 7: The system of Clause 6, wherein the instructions further cause the system to: calculate, based on the comparison of the set of interest trends with the locational data, a second experience for the user; and generate a graphical user interface (GUI) with a list for display on the user device, the list including the first experience, information about a first entity associated with the first experience, the second experience, and information about a second entity associated with the second experience, wherein the first experience and the second experience are ranked in the list based on time identifiers to provide a chronological list.

Clause 8: The system of any of the preceding Clauses, wherein the locational indicator is based on an event by the one or more accounts at an entity having a physical location outside of a predetermined distance from a base location of the user.

Clause 9: The system of Clause 8, wherein the base location is determined by historical physical locations of entities associated with the events completed using the one or more accounts associated with the user over a predetermined period of time.

Clause 10: The system of Clause 9, wherein the instructions further cause the system to: create, using the historical physical locations, an adjustable perimeter representing the base location; and continuously update, using a machine learning model (MLM), the adjustable perimeter based on subsequent events to have a real-time indication of the base location in which to determine the locational indicator.

Clause 11: The system of any of the preceding Clauses, wherein the instructions further cause the system to receive a search history from an application operating on the user device, wherein the locational indicator is based on the search history from the application.

Clause 12: The system of any of the preceding Clauses, wherein the instructions further cause the system to generate a graphical user interface (GUI) with a list for display on the user device, the list including the first experience and information about an entity associated with the first experience.

Clause 13: The system of Clause 12, wherein the instructions further cause the system to: receive geographic location data for an entity associated with the first experience; superimpose the geographic location on a digital map; and generate the GUI to include (i) the geographic location superimposed on the digital map and (ii) information about the entity associated with the first experience.

Clause 14: The system of Clause 12, wherein the instructions further cause the system to: generate a request field for display in the GUI; receive, from the user device and via input into the request field, an event request from the user device; and output the event request automatically to a service to effect a time at the entity associated with the first experience.

Clause 15: A system comprising: one or more processors; and a memory in communication with the one or more processors and storing instructions that, when executed by the one or more processors, are configured to cause the system to: receive user historical data related to events completed using one or more accounts associated with the user; identify, based on the user historical data, a set of interest trends for the user based on the events, the set of interest trends being based on particular events within user entity categories of the user historical data over a predetermined period of time; receive a locational indicator identifying a future trip for the user, the locational indicator providing a first destination; search locational data associated with the first destination to identify one or more experiences for the user, the locational data including a ranked list of entities associated with the user entity categories; calculate, based on the search, a first experience for the user, the first experience including information about a first entity associated with the user entity categories, the first entity having a physical location within a first predetermined distance from the first destination; and output, for display on a graphical user interface (GUI) viewable on a user device, the first experience.

Clause 16: The system of Clause 15, wherein the user entity categories are determined based on Category Codes associated with the events completed using the one or more accounts.

Clause 17: The system of Clause 15 or 16, wherein the instructions further cause the system to: generate the GUI to include a list for display on the user device, the list including the first experience and the information about the first entity; receive geographic location data for the first entity; superimpose the geographic location on a digital map; and generate the GUI to include the geographic location and the information about the first entity.

Clause 18: The system of Clause 17, wherein the instructions further cause the system to: generate a request field for display in the GUI; receive, from the user device and via input into the request field, an event request from the user device; and output the event request automatically to a service to effect a time at the first entity.

Clause 19: The system of any one of Clauses 15 to 18, wherein identifying the set of interest trends for the user further comprises identifying time identifiers associated with one or more accounts, wherein the time identifiers provide an indication of when the user interacts with one or more entities within the entity categories.

Clause 20: The system of any one of Clauses 15 to 19, wherein: the locational indicator is based on an event by the one or more accounts at an entity having a physical location outside of a predetermined distance from a base location of the user; and the base location is determined by historical physical locations of entities associated with the events completed using the one or more accounts associated with the user over a predetermined period of time; and the instructions further cause the system to: create, using the historical physical locations, an adjustable perimeter representing the base location; and continuously update, using a machine learning model (MLM), the adjustable perimeter based on subsequent events to have a real-time indication of the base location in which to determine the locational indicator.

The features and other aspects and principles of the disclosed embodiments can be implemented in various environments. Such environments and related applications can be specifically constructed for performing the various processes and operations of the disclosed embodiments or they can include a general-purpose computer or computing platform selectively activated or reconfigured by program code to provide the necessary functionality. Further, the processes disclosed herein can be implemented by a suitable combination of hardware, software, and/or firmware. For example, the disclosed embodiments can implement general purpose machines configured to execute software programs that perform processes consistent with the disclosed embodiments. Alternatively, the disclosed embodiments can implement a specialized apparatus or system configured to execute software programs that perform processes consistent with the disclosed embodiments. Furthermore, although some disclosed embodiments can be implemented by general purpose machines as computer processing instructions, all or a portion of the functionality of the disclosed embodiments can be implemented instead in dedicated electronics hardware.

The disclosed embodiments also relate to tangible and non-transitory computer readable media that include program instructions or program code that, when executed by one or more processors, perform one or more computer-implemented operations. The program instructions or program code can include specially designed and constructed instructions or code, and/or instructions and code well-known and available to those having ordinary skill in the computer software arts. For example, the disclosed embodiments can execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms can be used as building blocks for a framework, however certain implementations of the system can autonomously learn their own operation parameters, achieving better results, higher accuracy, fewer errors, fewer crashes, and greater speed.

As used in this application, the terms "component," "module," "system," "server." "processor," "memory," and the like are intended to include one or more computer-related units, such as but not limited to hardware, firmware, a combination of hardware and software, software, or software in execution. For example, a component can be, but is not limited to being, a process running on a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, can be repeated, or may not necessarily need to be performed at all, according to some embodiments or implementations of the disclosed technology.

These computer-executable program instructions can be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions can also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology can provide for a computer program product, including a computer-usable medium having a computer-readable program code or program instructions embodied therein, said computer-readable program code adapted to be executed to implement one or more functions specified in the flow diagram block or blocks. Likewise, the computer program instructions can be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices can include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology can be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations,"

"some implementations," etc., indicate that the implementation(s) of the disclosed technology so described can include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features can alternatively be implemented as systems, methods and/or non-transitory computer-readable media.

As used herein, unless otherwise specified, the use of the ordinal adjectives "first," "second." "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing instructions that, when executed by the one or more processors, are configured to cause the system to:
   receive user historical data related to events completed using one or more accounts associated with a user;
   identify, based on the user historical data, a set of interest trends for the user based on the events;
   generate a locational indicator based on:
     determining that each of a plurality of events is completed within a predetermined period of time using the one or more accounts associated with the user;
     determining that a quantity of the plurality of events is greater than or equal to a predetermined threshold number of events, the predetermined threshold number of events comprising at least two events; and
     determining that the plurality of events pertain to a location that is greater than a first predetermined distance away from a base location of the user;
   identify a future trip for the user based on the locational indicator, the locational indicator providing a first destination;
   search locational data associated with the first destination to identify one or more experiences for the user, the locational data being compiled to include prior interaction information for a plurality of users within a second predetermined distance from the first destination;
   compare the set of interest trends with the locational data;
   calculate, based on the comparison of the set of interest trends with the locational data, a first experience for the user; and
   output, for display on a user device, the first experience.

2. The system of claim 1, wherein the instructions further cause the system to create a ranked list of one or more entities within the locational data, the ranked list being created by identifying a quantity of interactions completed at the one or more entities by the plurality of users and ranking more frequented entities above less frequented entities.

3. The system of claim 2, wherein the instructions further cause the system to:
   receive user preferences indicating the user wishes to interact with the less frequented entities; and
   remove an upper threshold of entities from the ranked list, the upper threshold of entities including the more frequented entities.

4. The system of claim 2, wherein the instructions further cause the system to:
   receive an event indication from a first entity associated with the first experience, the event indication including data that the user interacted with the first entity; and
   retrain a machine learning model (MLM) based on the event indication to reconfigure the locational data and the ranked list.

5. The system of claim 1, wherein identifying the set of interest trends for the user comprises identifying entity categories within the user historical data, wherein the entity categories provide an indication of a type of good or service offered by one or more entities within the user historical data.

6. The system of claim 5, wherein identifying the set of interest trends for the user further comprises identifying time identifiers associated with one or more interactions associated with the entity categories, wherein the time identifiers provide an indication of when the user interacts with the one or more entities within the user historical data.

7. The system of claim 6, wherein the instructions further cause the system to:
calculate, based on the comparison of the set of interest trends with the locational data, a second experience for the user; and
generate a graphical user interface (GUI) with a list for display on the user device, the list including the first experience, information about a first entity associated with the first experience, the second experience, and information about a second entity associated with the second experience, wherein the first experience and the second experience are ranked in the list based on time identifiers to provide a chronological list.

8. The system of claim 1, wherein the base location is determined by historical physical locations of entities associated with the events completed using the one or more accounts associated with the user over a second predetermined period of time.

9. The system of claim 8, wherein the instructions further cause the system to:
create, using the historical physical locations, an adjustable perimeter representing the base location; and
continuously update, using a machine learning model (MLM), the adjustable perimeter based on subsequent events to have a real-time indication of the base location in which to determine the locational indicator.

10. The system of claim 1, wherein the instructions further cause the system to receive a search history from an application operating on the user device, wherein the locational indicator is based on the search history from the application.

11. The system of claim 1, wherein the instructions further cause the system to generate a graphical user interface (GUI) with a list for display on the user device, the list including the first experience and information about an entity associated with the first experience.

12. The system of claim 11, wherein the instructions further cause the system to:
receive geographic location data for an entity associated with the first experience;
superimpose the geographic location on a digital map; and
generate the GUI to include (i) the geographic location superimposed on the digital map and (ii) information about the entity associated with the first experience.

13. The system of claim 11, wherein the instructions further cause the system to:
generate a request field for display in the GUI;
receive, from the user device and via input into the request field, an event request from the user device; and
output the event request automatically to a service to effect a time at the entity associated with the first experience.

14. The system of claim 1, wherein comparing the set of interest trends with the locational data comprises identifying similar trends between the user's data near the base location and the plurality of users within the second predetermined distance from the first destination.

15. A system comprising:
one or more processors; and
a memory in communication with the one or more processors and storing instructions that, when executed by the one or more processors, are configured to cause the system to:
receive user historical data related to events completed using one or more accounts associated with a user;
identify, based on the user historical data, a set of interest trends for the user based on the events, the set of interest trends being based on particular events within user entity categories of the user historical data over a first predetermined period of time;
generate a locational indicator based on:
determining that each of a plurality of events is completed within a second predetermined period of time using the one or more accounts associated with the user;
determining that a quantity of the plurality of events is greater than or equal to a predetermined threshold number of events, the predetermined threshold number of events comprising at least two events; and
determining that the plurality of events pertain to a location that is greater than a first predetermined distance away from a base location of the user;
identify a future trip for the user based on the locational indicator, the locational indicator providing a first destination;
search locational data associated with the first destination to identify one or more experiences for the user, the locational data including a ranked list of entities associated with the user entity categories;
calculate, based on the search, a first experience for the user, the first experience including information about a first entity associated with the user entity categories, the first entity having a physical location within a second predetermined distance from the first destination; and
output, for display on a graphical user interface (GUI) viewable on a user device, the first experience.

16. The system of claim 15, wherein the user entity categories are determined based on category codes associated with the events completed using the one or more accounts.

17. The system of claim 15, wherein the instructions further cause the system to:
generate the GUI to include a list for display on the user device, the list including the first experience and the information about the first entity;
receive geographic location data for the first entity;
superimpose the geographic location on a digital map; and
generate the GUI to include the geographic location and the information about the first entity.

18. The system of claim 17, wherein the instructions further cause the system to:
generate a request field for display in the GUI;
receive, from the user device and via input into the request field, an event request from the user device; and
output the event request automatically to a service to effect a time at the first entity.

19. The system of claim 15, wherein identifying the set of interest trends for the user further comprises identifying time identifiers associated with one or more accounts, wherein the time identifiers provide an indication of when the user interacts with one or more entities within the user entity categories.

20. The system of claim 15, wherein:
the base location is determined by historical physical locations of entities associated with the events completed using the one or more accounts associated with the user over a third predetermined period of time; and
the instructions further cause the system to:
create, using the historical physical locations, an adjustable perimeter representing the base location; and
continuously update, using a machine learning model (MLM), the adjustable perimeter based on subsequent events to have a real-time indication of the base location in which to determine the locational indicator.

\* \* \* \* \*